Dec. 16, 1958  E. R. RAWSON ET AL  2,864,286
APPARATUS FOR MAKING DRY CELLS
Filed Oct. 28, 1953  12 Sheets-Sheet 1
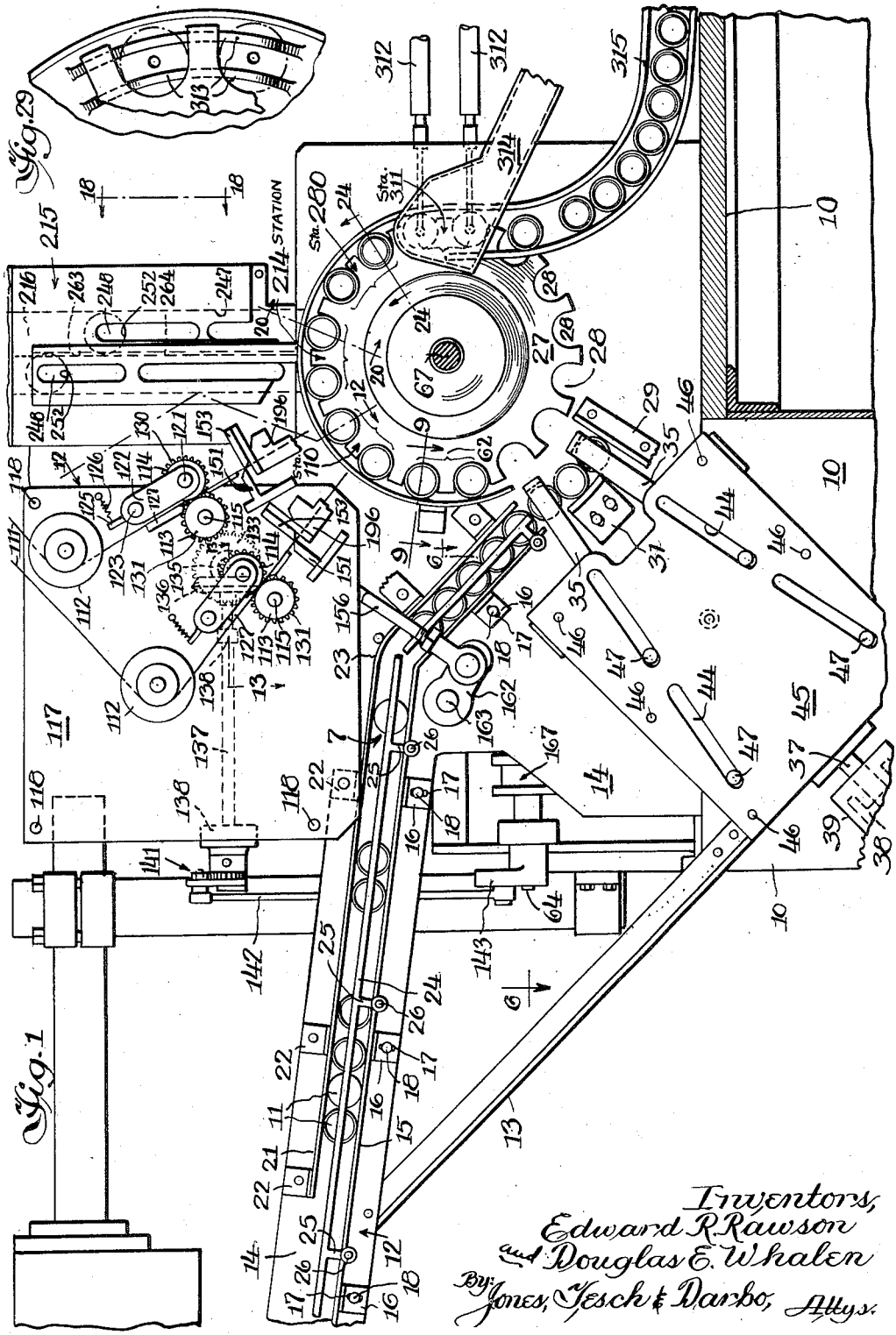
Inventors,
Edward R. Rawson
and Douglas E. Whalen
By Jones, Jesch & Darbo, Attys.

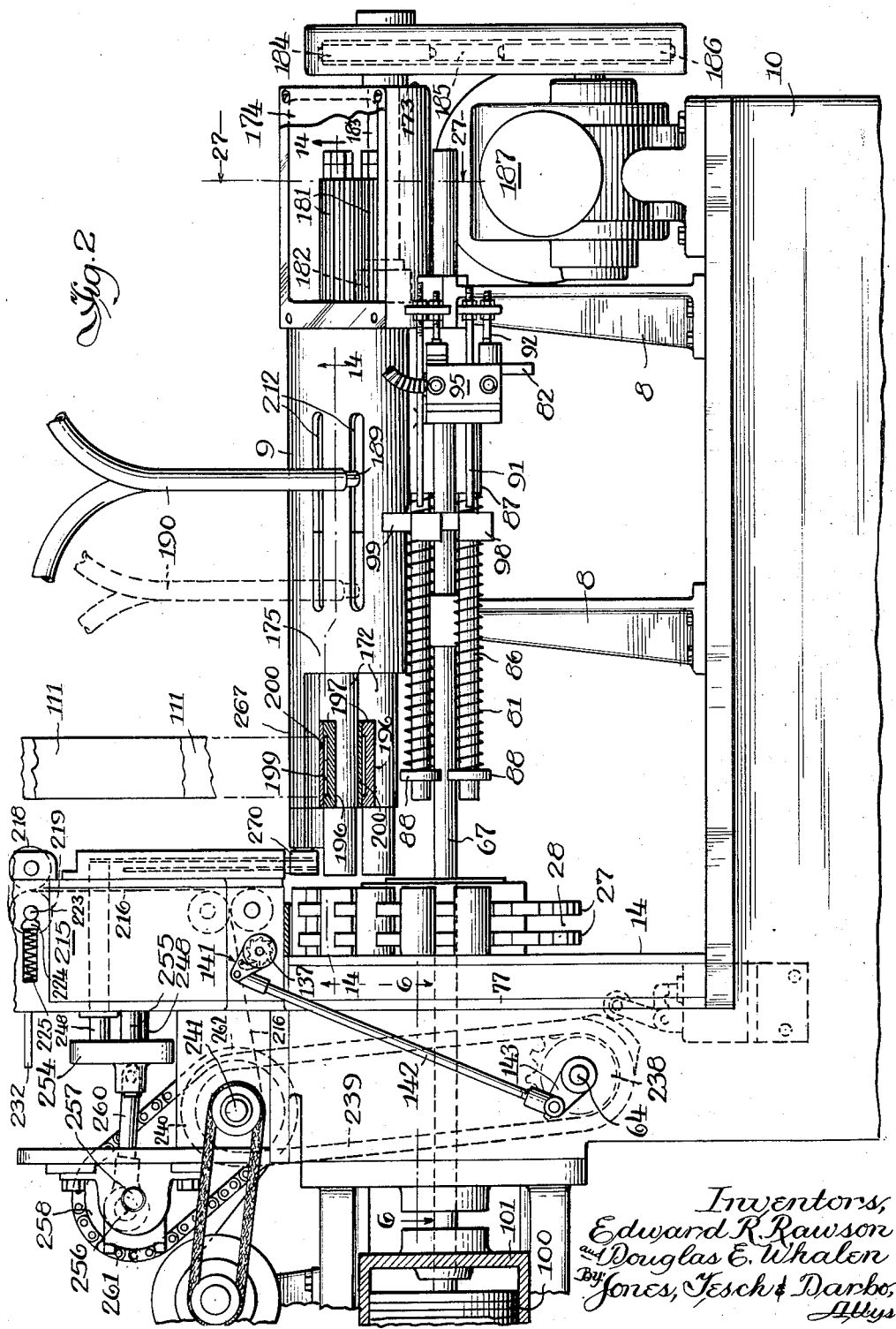

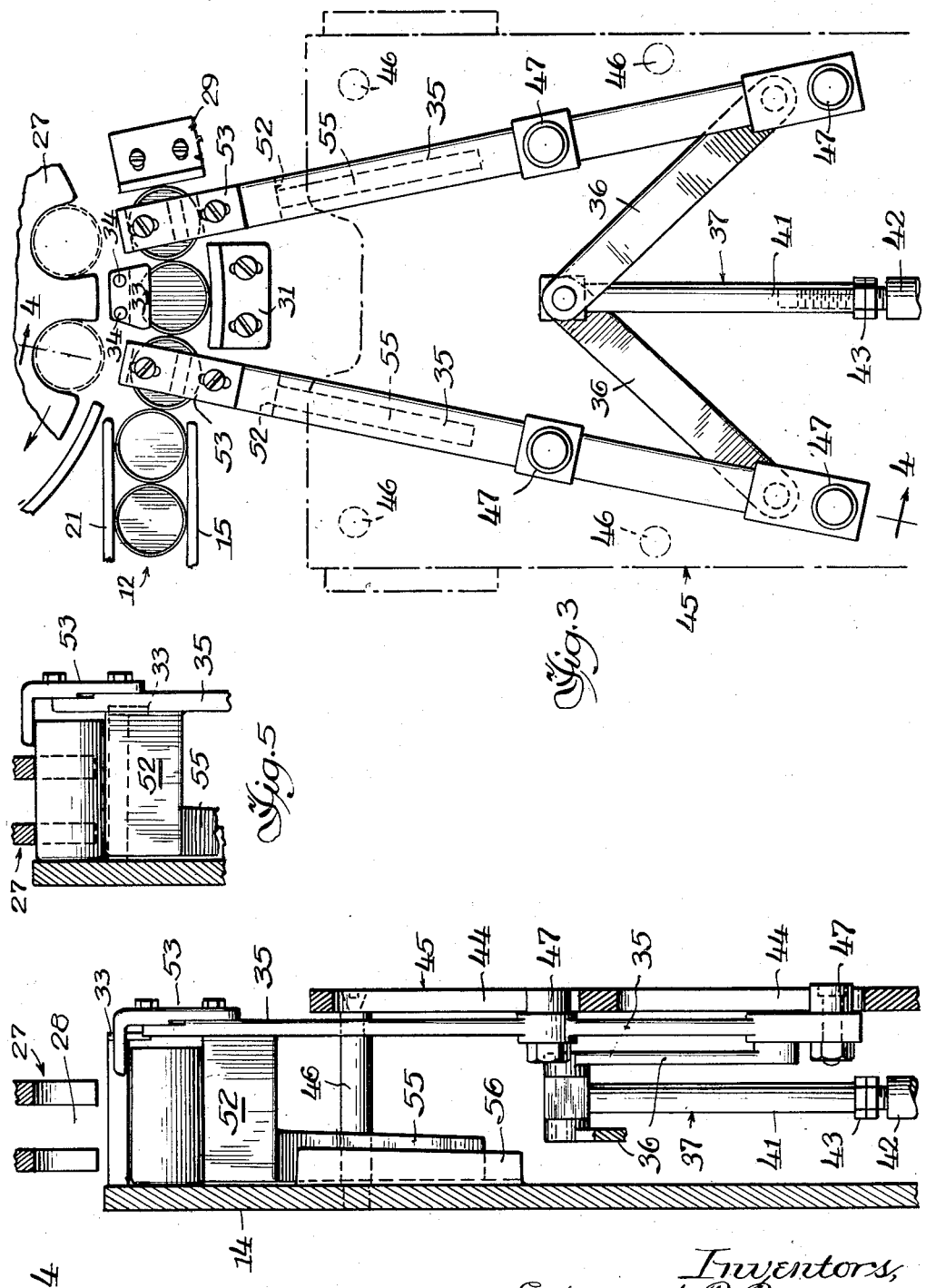

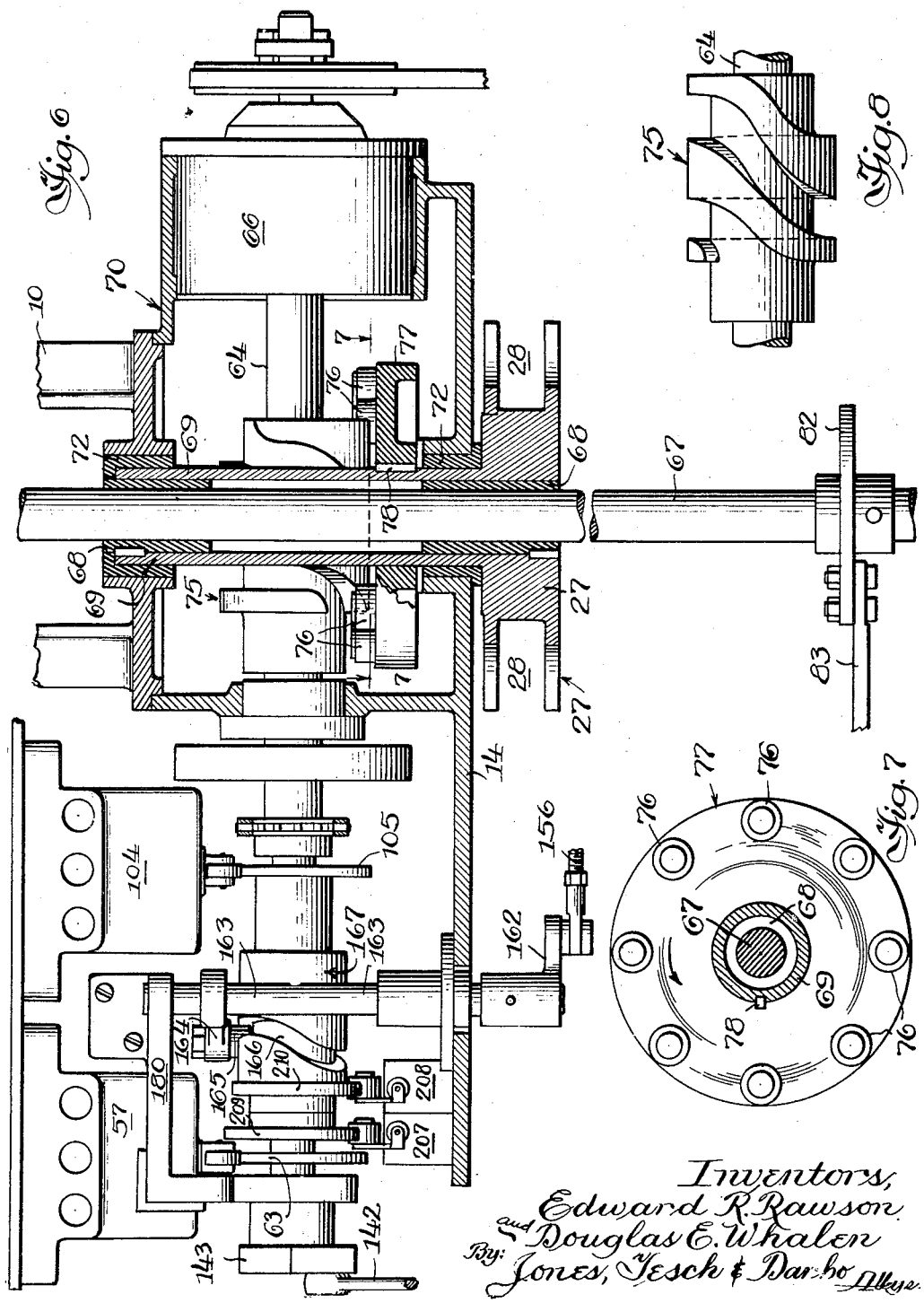

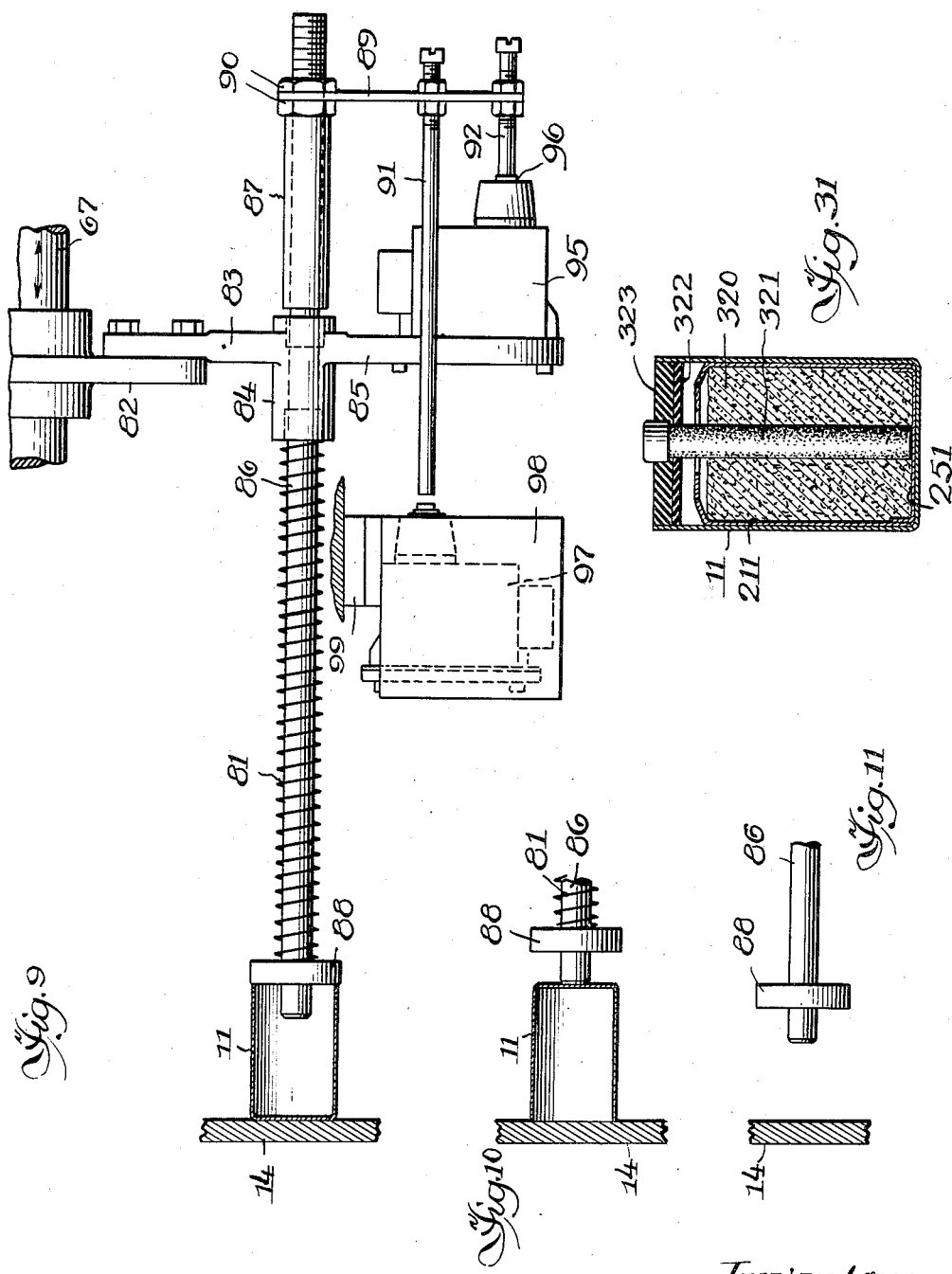

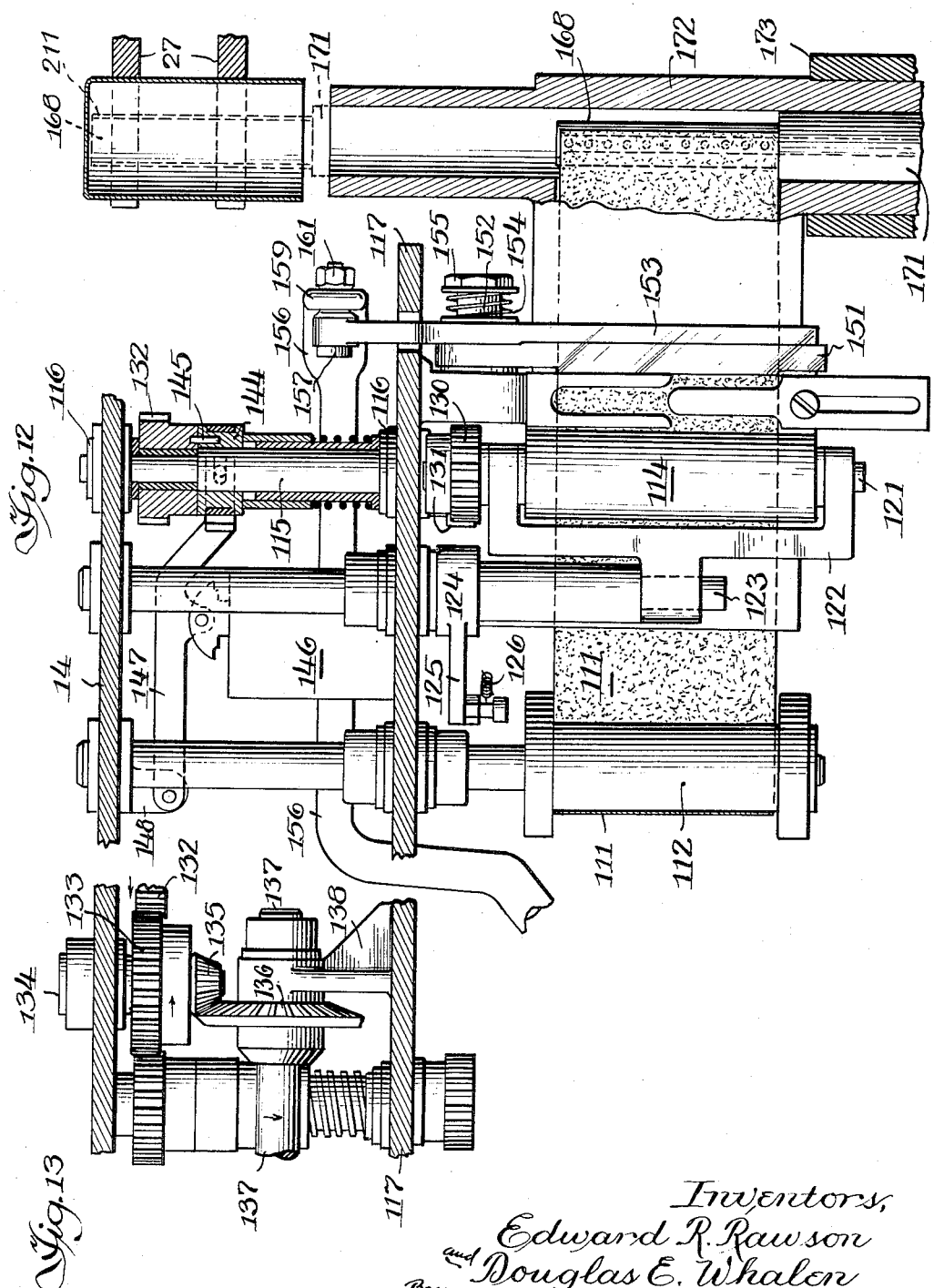

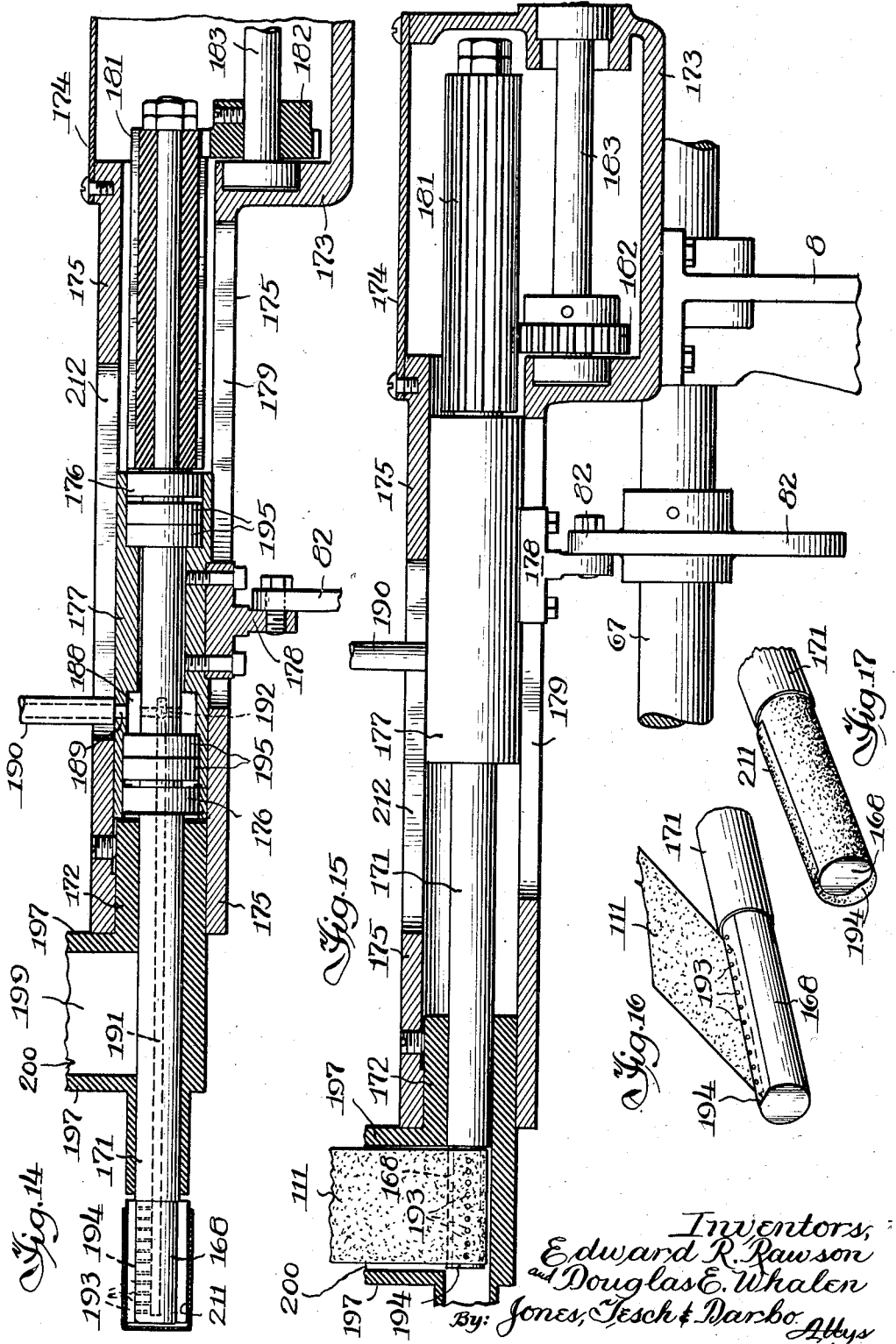

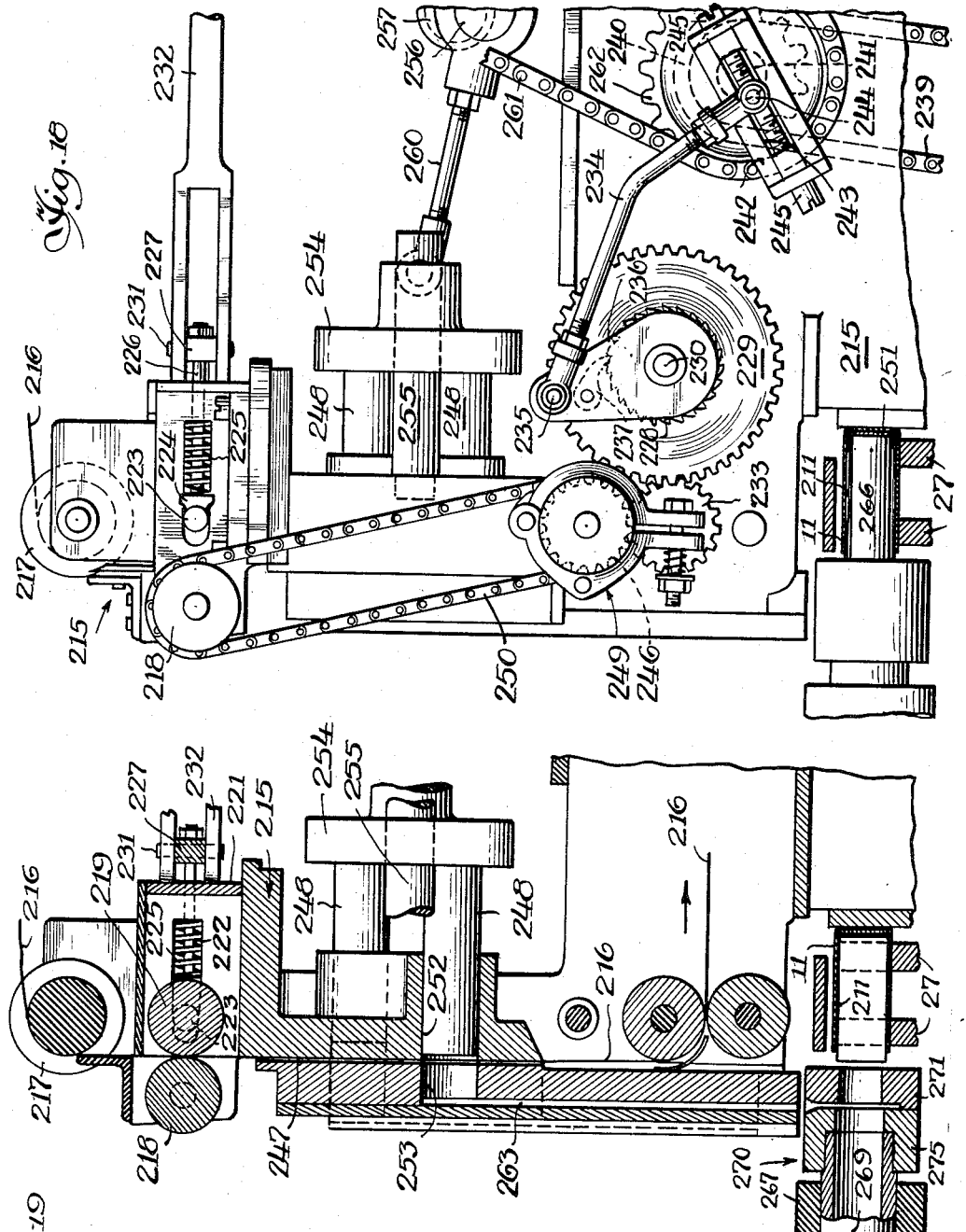

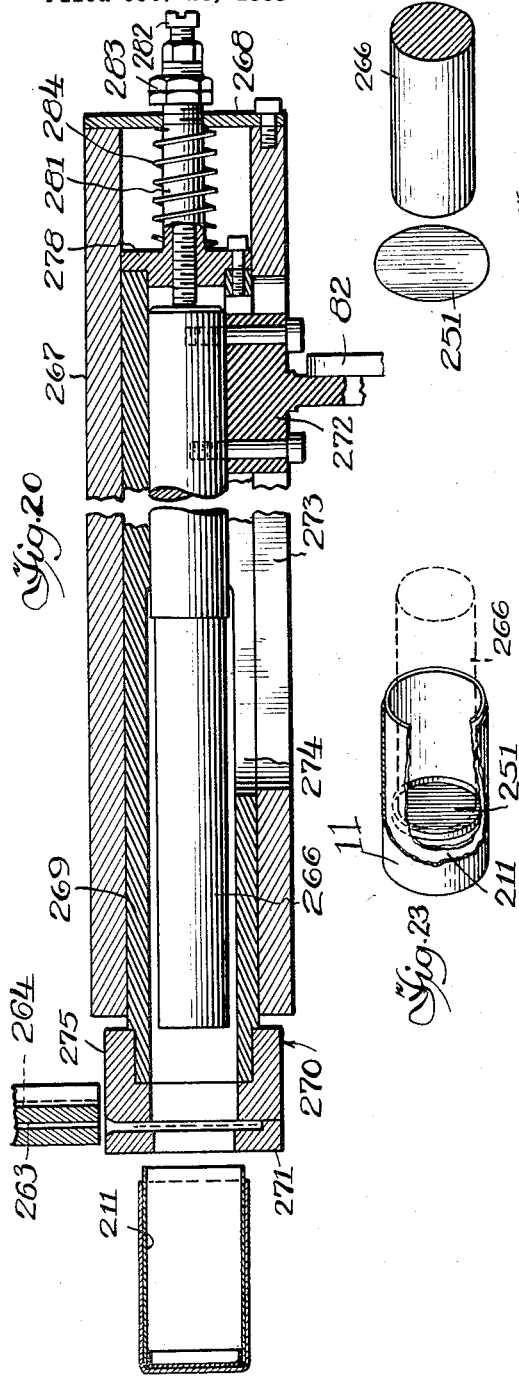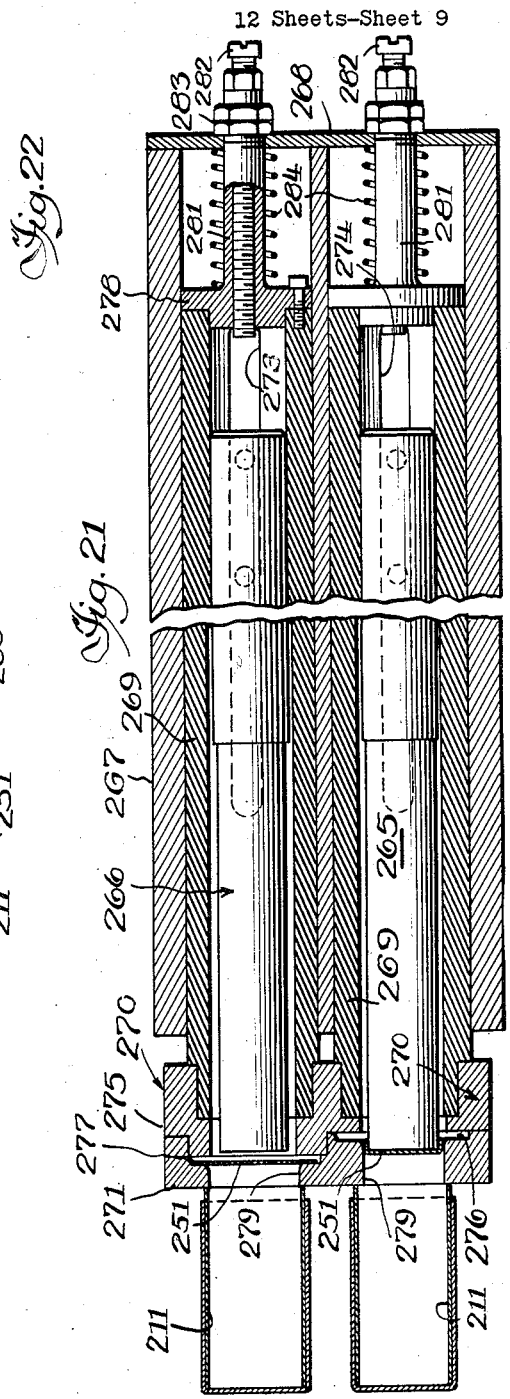

Dec. 16, 1958     E. R. RAWSON ET AL     2,864,286
APPARATUS FOR MAKING DRY CELLS

Filed Oct. 28, 1953     12 Sheets-Sheet 10

Inventors,
Edward R. Rawson
and Douglas E. Whalen,
By: Jones, Tesch & Darbo, Attys.

Dec. 16, 1958 E. R. RAWSON ET AL 2,864,286
APPARATUS FOR MAKING DRY CELLS
Filed Oct. 28, 1953 12 Sheets-Sheet 11
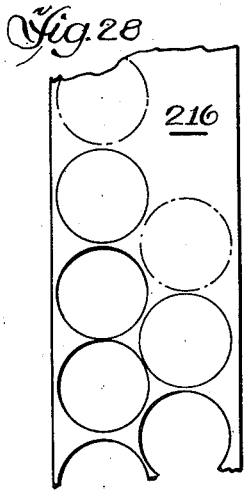
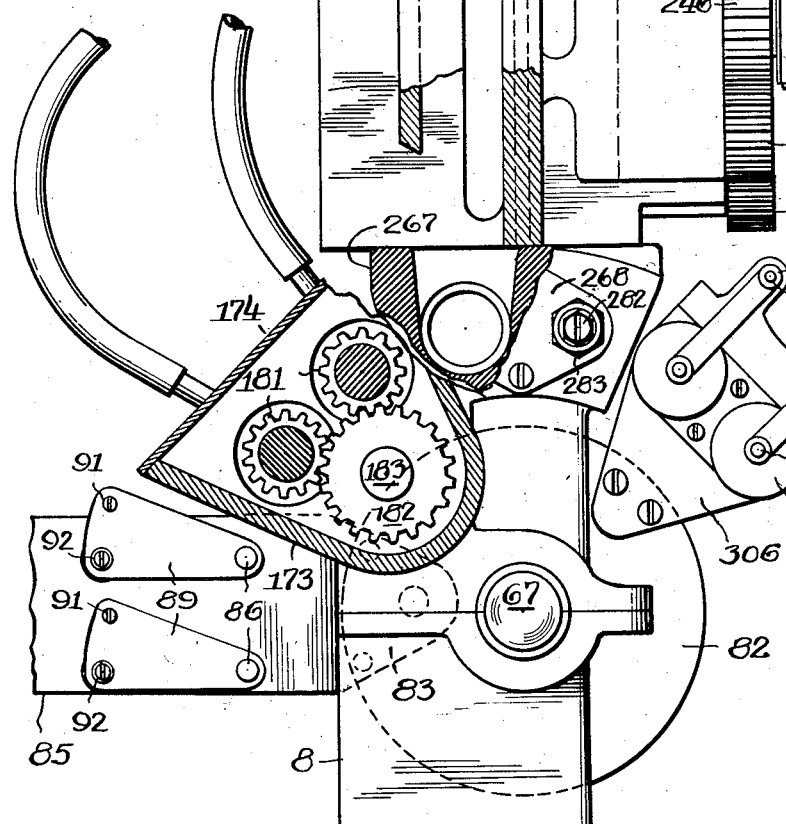
Inventors,
Edward R. Rawson
Douglas E. Whalen,
By Jones, Jesch & Darbo, Attys.

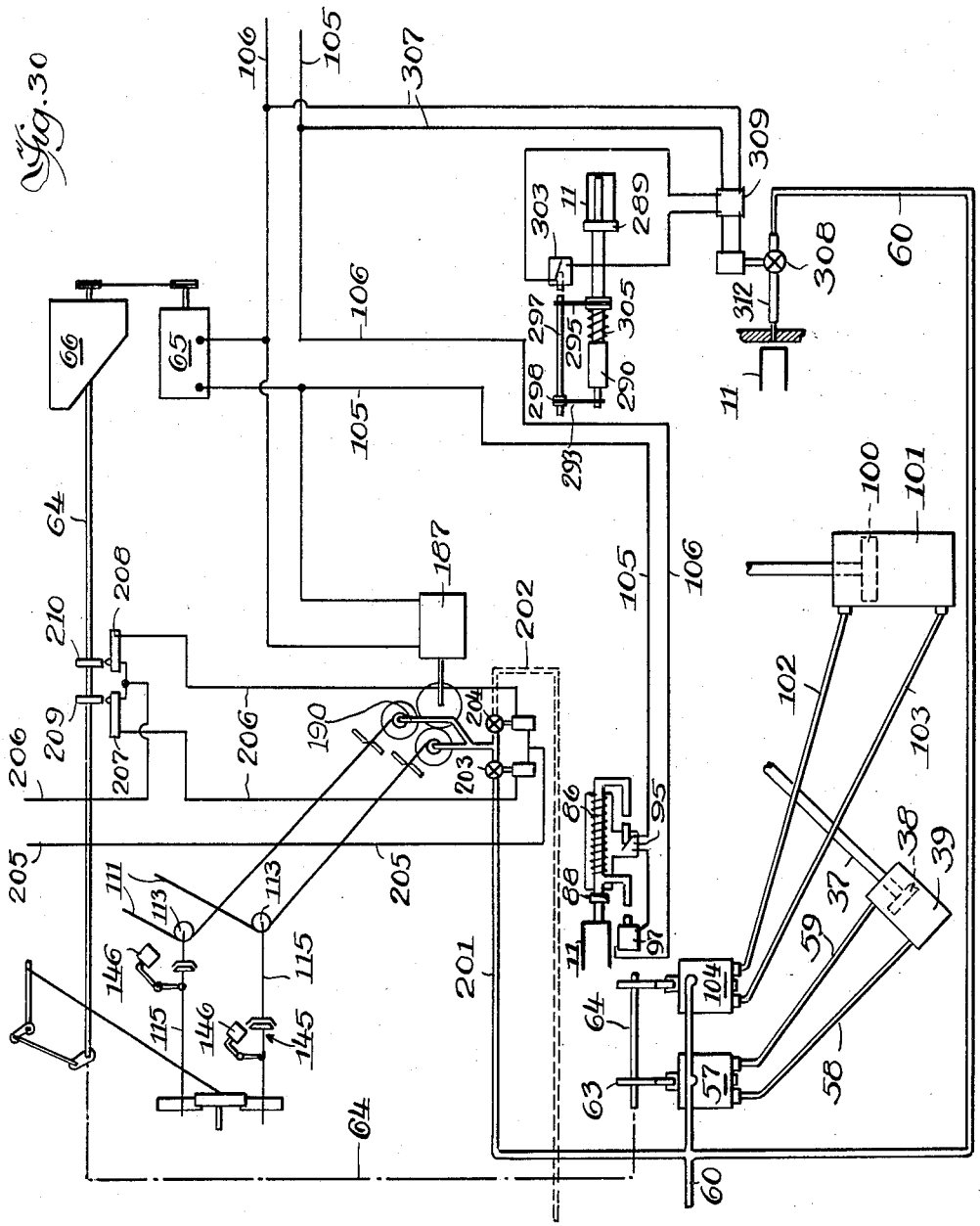

United States Patent Office 2,864,286
Patented Dec. 16, 1958

2,864,286

APPARATUS FOR MAKING DRY CELLS

Edward R. Rawson and Douglas E. Whalen, Freeport, Ill., assignors to Burgess Battery Company, Freeport, Ill., a corporation of Delaware Application October 28, 1953, Serial No. 388,826

10 Claims. (Cl. 93—36.01)

This invention relates to apparatus for making dry cells and particularly the cylindrical dry cells adapted for use in flashlights. In particular, it relates to apparatus for inserting a bibulous liner against the interior cylindrical wall of the cup-shaped anode of such a cell and an insulating disk against the bottom of the anode cup.

The dry cell with which the invention is concerned is the well known type in which the anode, usually of zinc, is in the form of an open-top cylindrical cup and the depolarizing mix is compressed within the cup and is separated from the cylindrical wall of the cup by one or more layers of bibulous paper, called a liner, and is separated from the bottom of the cup by a disk of paper or other insulating material which may be bibulous or electrolyte-impervious.

It is desirable that the manufacture of dry cells be mechanized to as great an extent as possible, and it is the object of the present invention to provide an improved apparatus for inserting the liners and bottom disks in the anode cups.

It is an object to provide an apparatus for inserting liners and bottom disks in the anode cups which is automatic.

It is a further object to provide an apparatus of the character described which includes means for feeding the cups and indexing them successively to different stations at which the various operations are carried out.

A further object is to provide an apparatus of the character described which includes means at the successive stations for performing the following operations: stopping the apparatus in case a cup is missing or improperly oriented; feeding a strip of liner material, cutting the strip into sections, coiling the sections into cylinders and inserting the cylinders into the cups; feeding a strip of insulating material, blanking bottom disks out of the strip and inserting the disks into the cups; detecting the presence of liners and bottom disks, and rejecting cups in which either the liner or the disk is absent. Of the foregoing operations, the last two are considered to be desirable but not essential, since detection and rejection of cups in which the liner or bottom disk is absent can be accomplished manually in a convenient manner, and an apparatus is considered to be satisfactorily complete which includes means for carrying out the remainder of the operations.

A further object is to provide an apparatus in which each of the operations is carried out substantially simultaneously upon two cups, that is, there is geminate mechanism for each operation, whereby the output of an apparatus of a given size is greatly increased over what it could be if each operation were carried out on a single cup.

Other objects and advantages will be apparent from the following description, which is to be taken in conjunction with the accompanying drawings in which—

Fig. 1 is a front view of the machine, with the mechanism for carrying out the operations on the cups at the different stations omitted;

Fig. 2 is a transverse view, partly in section, of a portion of the machine, showing the mechanism omitted in Fig. 1;

Fig. 3 is a front view of the mechanism for feeding cups into the indexing plate for indexing the cups to the various stations;

Fig. 4 is a view along line 4—4 of Fig. 3;

Fig. 5 is a partial view, similar to Fig. 4, showing the mechanism in a different position;

Fig. 6 is a view taken along line 6—6 of Fig. 2, showing the mechanism for indexing the indexing plate;

Fig. 7 is a view along line 7—7 of Fig. 6;

Fig. 8 is a longitudinal view of a barrel-cam used in the mechanism of Figs. 6 and 7;

Fig. 9 is a view along line 9—9 of Fig. 1 of the mechanism for testing for presence and proper orientation of a cup;

Figs. 10 and 11 are partial views, similar to Fig. 9, illustrating different conditions with respect to the cup;

Fig. 12 is a sectional view, taken along line 12—12 of Fig. 1, of the mechanism for feeding sheet material and forming liners therefrom;

Fig. 13 is a sectional view taken along line 13—13 of Fig. 1, of the sheet feeding mechanism;

Fig. 14 is a sectional view along line 14—14 of Fig. 2, of the mechanism for forming the cylindrical liners from strip material and inserting them into the cups;

Fig. 15 is a view similar to Fig. 14 showing the mechanism at a different stage of operation;

Figs. 16 and 17 are fragmental perspective views of the same mechanism showing different stages in the coiling of the sheet into a cylindrical liner;

Fig. 18 is a vertical view taken in the direction of line 18—18 of Fig. 1 from the right of the machine of the mechanism for feeding strip material and blanking bottom disks therefrom;

Fig. 19 is a view similar to Fig. 18 showing the mechanism in section;

Fig. 20 is a sectional view, taken along line 20—20 of Fig. 1 from the left of the machine, showing the mechanism for inserting bottom disks in the cups;

Fig. 21 is a view similar to Fig. 20 showing the geminate arrangement for inserting two disks in different cups;

Figs. 22 and 23 are fragmental perspective views showing the disk-inserting mechanism at different stages of operation;

Figs. 24, 25 and 26 are sectional views taken along line 24—24 of Fig. 1 (from the right of the machine) showing the mechanism for testing for the presence of the liner and the bottom disk, illustrating different test conditions;

Fig. 27 is a view along line 27—27 of Fig. 2, showing the duplicate character of the mechanism for performing the various operations, and also showing the means for feeding the disks to the disk inserting mechanism;

Fig. 28 is a view showing a fragment of a strip from which the disks have been blanked;

Fig. 29 is a fragmental view taken from the front of the machine, showing the means for ejecting a cup in which the disk or liner has not been properly inserted;

Fig. 30 is a diagrammatic view showing the pneumatic and electrical portions of the apparatus; and Fig. 31 is a sectional view of a completed cell for the making of which the apparatus of the present invention is adapted.

The machine has a main base 10 upon which the various operating parts are mounted. The anode cups 11 are fed individually by the operator upon a trackway indicated generally by the numeral 12 which is supported at one end by the angle bar 13 which, in turn, is supported upon the base 10. The back plate 14 of the machine forms the base for the trackway. Mounted on back plate 14 is the lower track rail 15 consisting of an elongated bar the plane of which is inclined downwardly toward the operating parts of the machine. Said rail 15 is supported by means of spaced-apart angle brackets 16 which are supported in vertically adjustable manner upon the back plate by means of elongated openings 17 and bolts 18. A cooperating upper track rail 21 is likewise supported upon back plate 14 by rigidly mounted brackets 22. The lower track rail 15 extends to the left, as viewed in Fig. 1, beyond the upper track rail 21 to enable the operator to conveniently feed the cups 11 into the end of the track. At a location 23 approaching the operating parts of the machine, the trackway undergoes a downward bend so as to feed the cups 11 more conveniently to the machine. At this end portion of the trackway, the back plate 14 is widened upwardly and downwardly and furnishes support for other parts of the apparatus as will be described hereinafter. The adjustable mounting for the lower track rail 15 makes it possible to adjust the width of the trackway and adapts the machine for operation upon cups of different diameters.

A front rail 24 is provided for the trackway, said rail being supported by spaced-apart brackets 25 which, in turn, are supported upon lugs 26 which are welded to the bottom track rail 15. Said front rail 24 is adjustable forward and backward upon the lugs 26 in order to accommodate cups 11 of different heights.

At its lower end, the trackway is open whereby the cups 11 feed down the trackway by gravity and into a mechanism which inserts the cans individually into an indexing plate 27 which rotates intermittently in a clockwise direction to move the cups to the different stations at which the various operations are performed. Said indexing plate 27 has at its periphery a continuous series of outwardly-opening recesses 28 which are suitably shaped and sized to receive the cups by lateral insertion and to move them to the various stations. The indexing plate and its operation will be described more in detail hereinafter.

As the cups 11 leave the lower end of the trackway they are supported laterally by guide members upon the mechanism which feeds them to the indexing plate, which mechanism will be described hereinafter, and by the separate individual guide plate 31 which is mounted adjustably upon back plate 14. At the end of their travel the cans come to rest against a combination stop and guide member 29 which is in the form of an angle bar, likewise supported adjustably upon the back plate 14. As is seen in Fig. 1, three cups are fed beyond the end of the trackway, two resting upon the feed mechanism and the third, which is between the first two, resting upon guide plate 31. The last-mentioned cup is retained against movement away from the back plate by means of the front retaining plate 33 (shown in Fig. 3; omitted in Fig. 1) which is supported upon the back plate 14 by means of posts 34.

The mechanism for inserting the cups into the recesses in the indexing plate 27 operates in synchronism with the indexing motion of said indexing plate. Two cups are inserted simultaneously into adjacent recesses, and succeeding operations are likewise carried out simultaneously upon two cups. The mechanism for inserting the cups comprises a pair of pusher bars 35 which are moved longitudinally by means of a toggle arrangement consisting of a pair of links 36 which are pivotally connected at the ends thereof to the pusher bars 35 and the longitudinally reciprocating drive rod 37, said rod being connected to a piston 38 (see Fig. 1) which operates by pneumatic pressure within a cylinder 39. The means for causing synchronous operation of the pusher bars 35 will be described hereinafter. To accommodate cups of different diameters, the drive rod 37 is in threadedly-engaged parts 41 and 42, the relative position of said parts being fixed by the locknuts 43.

The pusher bars 35 are guided in their longitudinal motion by the slots 44 in the guide plate 45 (shown in Fig. 4 and in outline only in Fig. 3), which is mounted forwardly upon back plate 14 by means of posts 46. Rollers 47 are mounted in spaced-apart relation upon the pusher bars 35 and serve to guide the pusher bars within slots 44. Additional guiding means is provided for each pusher bar 35 in the form of a lug 52 which is mounted as by welding upon the rearward side of the upper end portion of bar 35 and has a downward extension 55 which reciprocates between two guide bars 56 which are mounted as by welding upon base plate 14.

The pusher bars each have means for engaging the cups 11 and inserting them into the index plate recesses 28, said means consisting of the lug 52 which has been described. The bar 35 is also equipped with means for preventing the upward movement of the cup 11 in an undesired manner, which might be caused by the pressure of the column of cups in the trackway, said retaining means consisting of the angle strap 53 which is connected in a longitudinally adjustable manner to the bar 35 as shown in Fig. 4 in order to accommodate cups of different diameters. In operation, the two pusher bars 35 move upwardly simultaneously to insert two cups in adjacent index plate recesses; the index plate is then indexed to the next position, whereby the two cups are moved laterally out of the pockets formed by the bars 35, the lugs 52 and the angle bars 53, and then the pusher bars 35 move downwardly again into position to receive two more cups in the pockets thereof, this action all being carried out in synchronism as will be described more in detail hereinafter.

The reciprocation of piston 38 in cylinder 39 is caused by the controlled admission and exhaust of air under pressure to and from the cylinder 39 by means of the air pressure supply conduit 60 (see Fig. 30), the combination inlet and exhaust valve 57 and combination inlet and exhaust pipes 58 and 59. The valve 57 is of conventional design and the construction thereof is not shown. It is so constructed that when air is conveyed therethrough under pressure from conduit 60 to pipe 58, air from pipe 59 is exhausted therethrough to the atmosphere, and when air is conveyed therethrough to pipe 59, air from pipe 58 is exhausted therethrough to the atmosphere. The valve is operated by the cam 63 which is mounted on shaft 64 which is turned by the continuously running motor 65. A speed reducer 66 of conventional design is connected in the line of power transmission between motor 65 and shaft 64. The arrangement is such that at the proper intervals, in synchronization with the remainder of the machine, air under pressure is introduced into cylinder 39 by pipe 58 and exhausted through pipe 59, and vice versa to provide power movement of the piston 39 in both directions.

Assuming that the pusher bars 35 have inserted two cups 11 in two adjacent recesses 28 at the first station of the indexing plate 27 as indicated in dotted lines in Fig. 3, the plate 27 is then indexed to the second station, designated by the numeral 62, at which station an operation takes place upon the cups. The mechanism for indexing the plate will now be described, and in connection with this feature it should be explained that indexing plate 27 is actually a double plate as shown in Fig. 2, consisting of two parallel recessed flanges integral with a hub portion.

The indexing plate 27 is mounted for rotation within bearings 72 which are mounted upon front and rear walls of gear case 70 which is supported by plate 14 and members of main frame 10. The hub of the indexing plate has a tubular extension 69 projecting rearwardly therefrom, said extension being supported by front and rear bearings 72. Within extension 69 and the hub of indexing plate 27 and keyed thereto are front and rear sleeve-form bearings 68 within which the shaft 67 is mounted in freely reciprocable manner.

The means for imparting intermittent movement to the indexing plate 27 consists of the speed reducer 66 which, as described heretofore, is connected in motion transmissive relationship to the motor 65. Shaft 64 is connected to the speed reducer, and mounted fixedly on shaft 64 is a barrel cam 75 which has a groove which, throughout a portion of its length extends in a circular direction and throughout other portions of its length extends in a spiral direction. Said barrel cam cooperates with the cam rollers 76 upon cam plate 77 to impart the intermittent movement to the cam plate. The cam plate is keyed by key 78 to the sleeve extension 69 of the indexing plate 27 whereby movement is imparted to the indexing plate. During the moments when the cylindrical portions of the groove of cam 75 are in engagement with cam rollers 76 the indexing plate 27 is stationary for the particular operation upon the cups 11, and during the moments that the spiral portions of said groove are in engagement with the cam rollers the indexing plate is being indexed to the next station.

Assuming that the cups 11 have been moved to station 62, means are provided for detecting at this station the absence and improper orientation of the cups. Assuming first that the cup is present and the orientation thereof is correct, such a cup is shown in Fig. 9. The bottom of the cup rests against the back plate 14 and the open end faces forwardly. The mechanism for making the test is as follows:

A disk-shaped spider 82 is fixedly mounted upon shaft 67, and an arm 83 is fixedly attached to the spider and extends laterally therefrom as shown in Figs. 6 and 9, the extending portion of said arm having an integral hub 84, and beyond said hub is a terminal extension 85 of said arm. A rod 86 is received in hub 84 and is adapted to reciprocate longitudinally therein, said rod being spring-urged in the rearward direction by the compression spring 81 which surrounds rod 86 and is compressed between hub 84 and the collar 88 which is fixedly mounted as by a press fit upon the rearward end portion of said rod. A sleeve 87 is fastened to the forward end of said rod by suitable means as a sliding fit.

A second arm 89 is mounted upon the forward end of rod 86 by means of the nuts 90 and extends laterally therefrom. The two longitudinally-extending switch-operating push-rods 91 and 92 are mounted in longitudinally adjustable manner upon arm 89 at spaced-apart locations thereon. Mounted upon the extending portion 85 of arm 83 is a normally open switch 95 having an operating plunger 96 in cooperative relation with push rod 92.

A normally closed switch 97 is arranged in cooperative relation with push rod 91. Said switch is mounted in a box 98, which, in turn, is supported by bracket 99 which is mounted exteriorly upon the stationary main machine housing. It is to be noted that switch 95 moves with spider 82 while switch 97 is stationary.

It is understood that there are two mechanisms of the type being described because the geminate character of the machine is indicated in Fig. 2. Only one mechanism will be described in detail herein.

With the cup 11 present and in the proper position as shown in Fig. 9, the spider 82 is moved from a forward position in which the collar 88 is entirely clear of the cup to a rearward position in which the collar 88 makes contact with the edge of the cup. Back and forth motion is imparted to spider 82 by the shaft 67 which, in turn, reciprocates within bearings 68 under the influence of air pressure in the piston-cylinder arrangement 100—101 shown in Fig. 2. The air pressure and exhaust to and from the forward and rearward portions of cylinder 101 are accomplished by means of pipes 102 and 103, valve 104, pressure supply line 60, cam 105 and shaft 64 in a manner similar to that described heretofore in connection with the operation of piston 38 in cylinder 39 (see Fig. 30).

Assuming that the cup 11 is present and properly oriented at the second station as shown in Fig. 9, the spider 82 moves the rod 86 from a position forward and clear of the cup 11 rearwardly to a position in which the collar 88 makes contact with the edge of the cup. The arrangement of the parts is such that the spider 82 moves rearwardly a slight distance further, say ¼ inch. The rod 86 is stopped, however, by contact between collar 88 and cup 11, and the push bars 91 and 92 are likewise stopped. The positioning of push bars 91 and 92 is such that bar 91 does not make contact with the operating plunger of switch 97 and said switch remains in the closed position.

When spider 82 moves rearwardly the slight distance while rod 86 is held stationary by collar 88, arm 85 carries switch 95 rearwardly that slight distance and away from the operating end of push bar 92. Switch 95 is designed, however, to have tolerance such that this slight relative movement does not cause operation of the switch. The push bar 92 holds the switch 95 in the closed position and the slight movement is not sufficient to cause operation of the switch to the open position. Therefore, both switches 95 and 97 remain in the closed position, and the operation of the machine continues without interruption.

Assume as a second condition that the cup 11 is in the reverse position in which the bottom is presented to the end of rod 86, as is shown in Fig. 10 and also at the position indicated by the numeral 7 in Fig. 1. Now, when the spider 82 moves the rod 86 toward the cup, the end of the rod makes contact with the bottom of the cup and the rod and the push bars 91 and 92 are held in a position substantially farther forward than is shown in Fig. 9. As a result the end of push bar 91 does not make contact with the switch 97 and said switch remains in the closed position, but switch 95, being carried by arm 85, moves rearwardly to the same position as is shown in Fig. 9 in which position it is clear of push bar 92, and the operating plunger 96 is separated from the end of push bar 92. As a result, switch 95 is allowed to assume its normal open position, the electrical circuit is opened, and operation of the machine is stopped. Said circuit is the main supply circuit 105—106 for the motor 65 which operates the machine, as is shown in Fig. 30.

Assume as a third condition that the cup 11 is absent, as is illustrated in Fig. 11. In this condition, upon forward movement of the spider 82, neither the rod 86 nor the collar 88 encounters a stopping force and the push rods 91 and 92 move rearwardly to their farthermost positions. In this condition, the push rod 92 continues to make contact with the plunger 96 of switch 95 and said switch remains in the closed position, and push rod 91 makes operating contact with the plunger of switch 97 and operates said switch to the open position. Again, the supply circuit is opened and energy to the operating motor 65 is interrupted.

When the machine is stopped by either event, that is, the absence or misorientation of the cup, the condition is corrected by the operator placing a cup in the indexing plate recess at the proper location and in the proper orientation. This is essential because otherwise the machine will attempt to insert a liner and bottom disk in a non-existent or turned-around cup.

In synchronism with the operation of the machine, after the test for the absence and improper orientation of the cup 11 has been made, the piston-cylinder arrangement 100—101 causes retraction of the testing mechanism out of the way of the indexing plate 27 and the cup 11 and the indexing plate is indexed by the mechanism heretofore described to the third station, which for convenience is designated by the numeral 110, at which a cylindrical interior liner of bibulous paper is inserted into the cup and against the side wall thereof.

As stated heretofore, the apparatus is of geminate character, and two liners are inserted simultaneously.

The two insertion mechanisms are illustrated in Fig. 1, but only one is illustrated in detail in Figs. 12 and 13. The liner material is an absorbent paper and is supplied in the form of a continuous strip or ribbon 111 thereof from a source of supply which is not shown. It is fed over guide rolls 112 and then downwardly between a pair of feed rolls 113 and 114. Feed roll 113 is mounted fixedly on shaft 115 which is mounted upon suitable bearings 116 in the back plate 14 and the supporting plate 117 which is spaced forwardly of plate 14 and suitably mounted thereon by the posts 118. The cooperating feed roll 114 is mounted in pressure-engagement with roll 113 upon shaft 121 which is supported in Y-bracket 122 which is fixedly mounted on shaft 123 which is rotatably mounted in suitable bearings in plates 14 and 117. Crank member 124 is mounted fixedly upon shaft 123 and has arm 125 projecting laterally therefrom which arm is continuously urged in a direction so as to press roll 114 against roll 113 by tension spring 126 which is fixed at the other end thereof to a pin mounted upon plate 117. In its travel to the feed rolls 113 and 114, the strip 111 passes through a slotted guide member 127 which is suitably mounted upon supporting plate 117.

Intermittent forward motion is imparted to the strip by mechanism which will now be described. Shaft 115 of feed roll 113 carries drive gear 131 which meshes with gear 130 which drives roll 114. In Fig. 12, gear 131 actually is not seen because it is obscured by gear 130, but for the purpose of clarity these two gears are shown offset slightly. Shaft 115 is driven by the gear 132 which, in turn, is driven by gear 133 which is fixedly mounted on shaft 134 which is freely rotatable upon supporting plate 14. At the forward end of shaft 134 is bevel pinion 135 which is driven by bevel gear 136 mounted on shaft 137 which is rotatably mounted in bracket bearing 138 supported by forward supporting plate 117. Shaft 137 is driven intermittently by the ratchet and pawl arrangement 141, which is driven by the longitudinally reciprocating arm 142 which, in turn, is connected by the crank 143 to the end of shaft 64 which is driven continuously by the motor 65. As is indicated in Fig. 2 the arrangement imparts a counterclockwise movement to the shaft 137 during each downward movement of the arm 142, and forward motion is thereby transmitted to the strip of paper 111.

In the line of power transmission to the feed rolls 113 and 114, means are provided for disengaging the power to permit the operator to stop the feed in case of trouble, and this consists of the pin-clutch arrangement consisting of the collar 144 which is freely slideable on shaft 115 and is spring-urged toward gear 132. A pin 145 projects rearwardly from collar 144 and engages a recess in gear 132 when the two elements are in a certain predetermined relative position. This pin-clutch arrangement is adapted for the purpose of assuring that the driving and driven parts of the clutch will, in operation, always be in the proper relative positions so that movement is imparted to the strip in proper synchronization with the other operations of the machine. Disengagement of the clutch is accomplished by the operator energizing the solenoid 146 by any suitable switch means (not shown) which draws the armature of the solenoid to the forward position, said armature being connected to the arm 147 which is pivotally connected at one end upon bracket 148 which is supported by plate 14, and at the other end is suitably fastened to collar 144. Energization of solenoid 146 causes forward movement of collar 144 and pin 145 out of engagement with gear 132.

The arrangement is such that at each intermittent motion of the feed roll the strip is fed a distance equal to the length of paper required for the liner. During the period while the strip is stationary, a length is severed from the forward end thereof by suitable shearing mechanism consisting of stationary shear blade 151 which is rigidly mounted upon shaft 152 which, in turn, is suitably mounted upon the front supporting plate 117. Cooperating with blade 151 is movable blade 153 which is pivotally mounted upon shaft 152 and continuously urged against the stationary blade 151 by the compression spring 154 which is under compression between nut 155 at the end of shaft 152 and the surface of movable blade 153. The shank of blade 153 extends rearwardly beyond shaft 152 and at the end thereof is connected to link 156. Such connection is by means of a headed pin 157 which passes through an opening in the end of blade 153 and through an opening in the end portion 159 of link 156 which is bent at right angles to the main portion of the arm. The end of pin 157 is threaded and a nut 161 is threaded thereon. To permit end 159 to undergo angular motion as well as translational motion, the fastening surfaces of end 159 of arm 156 are internally beveled and the cooperating surfaces of nut 161 and blade 153 are externally beveled, said beveled surfaces being slightly rounded rather than frusto-conical. Arm 156 proceeds from the end 159 thereof in a direction laterally of the machine and substantially parallel to front plate 117 for a distance and then bends substantially at right angles and proceeds forwardly and diagonally downwardly to the end thereof (see Figs. 1 and 6) where it is connected to crank 162 which is rigidly mounted on the end of shaft 163. Shaft 163 is rotatably mounted in suitable bearings in plate 14 and bracket 180 which is supported on the main frame 10. Adjacent to its rear end, shaft 163 has an arm 164 rigidly attached thereto and projecting diagonally downwardly, said arm having a cam roller 165 at the end thereof. The cam roller 165 cooperates with the groove 166 in barrel-cam 167 which is fixedly mounted on shaft 64. Groove 166 extends continuously around the circumference of cam 167 and has sidewise undulations whereby it imparts a back-and-forth oscillating motion to arm 164, shaft 163 and crank 162, said oscillating motion being transmitted by link 156 to the movable blade 153 of the paper shears.

The arrangement is such that when the end section of the strip 111 is severed, the bottom end portion thereof rests in over-lying relationship to a continuously rotating mandrel 168 upon which the severed sheet is rolled into cylindrical form, after which the mandrel moves longitudinally rearwardly and inserts the paper cylinder into the cup 11. The mandrel is carried by the elongated cylindrical mandrel shank 171 which is mounted for rotation and longitudinal reciprocation, said mandrel being rotatable for the purpose of winding the sheets 111 thereupon as shown in Figs. 12 and 15 and reciprocatable forwardly from said position to the position shown in Fig. 14 and in dotted lines in Fig. 12 at which position the formed paper cylinder is inserted in the cup 11.

The liner-inserting mechanism is as follows. A housing 173 is fixedly supported upon machine standards 8 (see Figs. 2 and 15). Said housing has an enlarged forward end portion having a removable cover 174 thereon and a reduced generally cylindrical rearward section 175. The mandrel shank 171 extends throughout the length of the housing 173—175 and beyond the rearward end thereof. It is mounted within said housing for rotation upon bearings 176 which, in turn, are mounted within the interior of a hollow intermediate carrier member 177 which is reciprocable longitudinally within housing section 175. Reciprocating motion is imparted to carrier 177 by the bracket 178 which is fastened to the exterior of said carrier and extends through an elongated slot 179 in housing 175. The bracket 178 also serves as a spline which cooperates with the slot 179 to prevent angular movement of the carrier 177 and other parts of the machine. The bracket 178 is fastened to spider 82 which, by reason of the motion transmitted to it by shaft 67 imparts reciprocating motion to the carrier 177.

Mandrel shank 171 undergoes continuous rotation, for which purpose an elongated toothed gear 181 is fixedly mounted on the forward end thereof, which gear cooperates with the driving gear 182, which is fixedly mounted on shaft 183, which is driven by means of pulleys 184 and 186, belt 185 and motor 187 which is mounted on the main frame 10 of the machine. As is seen in Fig. 2, there are two mechanisms which are duplicates of each other, each of which is adapted to insert a liner in a cup.

For the purpose of transmitting suction and pressure to the mandrel 168 at predetermined intervals, carrier 177 is provided with an enlarged hollow interior 188 which is connected to air pressure and suction nipple 189 which passes through the side wall of the carrier and is connected to flexible tube 190. An elongated slot 212 is provided in the upper wall of housing 175 to accommodate nipple 189 and tube 190 during reciprocation of the mandrel. Mandrel shank 171 has a longitudinal passageway 191 therein, and within carrier 177 said longitudinal passageway 191 connects with lateral passageways 192 which communicate with enlarged chamber 188. Said longitudinal passageway 191 continues into the mandrel 168 proper to the closed end thereof and within the mandrel is connected to a series of lateral passageways 193 which communicate with the flattened portion 194 of the surface of said mandrel. The reason for this flattened surface will be explained hereinafter. To prevent the loss of suction or pressure in this closed system, packing members 195 are provided between the mandrel shank 171 and the interior of carrier 177 at each end of said carrier. The longitudinal travel of the mandrel and mandrel shank is controlled by the travel of the piston 100 in cylinder 101.

A stationary sleeve member 172 is mounted within the rearward end of housing section 175. Sleeve member 172 has a frictionless surface in contact with mandrel shank 171 and said shank is freely reciprocable within said sleeve member. Laterally connected to said sleeve member 172 are means forming a guide slot 199 for guiding the section of sheet 111 to the mandrel 168. The said means comprises a shallow channel member 196 having narrow flanges 197 and a flat cover plate 200.

The flexible air pressure and suction tube 190 is connected to the sources of air pressure and suction 201 and 202 (see Fig. 30) through solenoid-operated valves 203 and 204, the solenoids of said valves being connected separately to a suitable source of electrical energy by means of supply circuits 205 and 206, said circuits having connected in series therein, respectively, switches 207 and 208. The switches are operated, respectively, by cams 209 and 210, which are fixedly mounted on shaft 64. When either switch is closed, the solenoid valve connected thereto is closed, and vice versa.

The operation of the liner-inserting mechanism is as follows. Assume that the indexing plate 27 has moved the cup 11 to the liner-inserting station 110. The continuously rotating mandrel 168 is in its forward position, shown in Fig. 15, and the severed section of the paper sheet 11 has been fed downwardly in slot 199 to the position shown in Fig. 15 in which the end portion of the sheet overlies the mandrel. At this time cam 210 causes opening of switch 208 whereby solenoid valve 204 is open and suction from source 202 is applied to the mandrel 168. As the flattened portion 194 of the mandrel passes the end portion of the sheet, suction is being applied to the passageways 193 and the sheet is drawn into frictional contact with said flattened portion and is wound upon the mandrel in the form of the cylinder 211. It has been found in the operation of this machine that the flattened portion 194 is more effective in drawing the sheet into attachment with the mandrel than is a cylindrical surface, and reliable operation without failure is realized.

The mandrel, with the attached paper cylinder 211 thereon is then moved rearwardly by the spider 82 into the position shown in Fig. 14 in which the cylinder 211 is located within the cup 11. At this instant, the cam 210 operates to close switch 208 whereby solenoid valve 204 is closed and the suction relieved from the mandrel, and at substantially the same instant cam 209 opens switch 207 whereby solenoid valve 203 is opened to admit air under pressure to the mandrel and eject the cylinder 211 therefrom. Under the normal resilience of the paper, the cylinder 211 spreads and expands away from the mandrel and into contact with the interior cylindrical wall of the cup 11. Substantially immediately thereafter, cams 209 and 210 again close switch 207 and open switch 208 whereby valve 203 is closed and valve 204 is opened and suction is applied to the mandrel in readiness for the next cylinder-forming operation. Substantially simultaneously with these operations, the mandrel is returned by spider 82 to its forward position and the cycle of operations is repeated.

After the liner 211 has been inserted in the cup 11 and the mandrel 168 has been withdrawn to its forward position, the indexing plate 27 is indexed to the next station at which a bottom disk is inserted into each of two cups 11, which station is designated by the numeral 214. Mechanism for feeding a strip of paper, blanking the disks out of the strip and feeding the disks downwardly to the inserting mechanism is mounted upon superstructure 215 which is suitably mounted upon the main frame of the machine (see Figs. 2, 18 and 19). The strip 216 is fed from a source of supply (not shown) over the guide spool 217 and downwardly between a pair of feed rolls 218 and 219 which are operated intermittently to feed the strip in proper synchronism with the operation of the machine. Feed roll 218 is mounted in a fixed bearing in the superstructure 215 while roll 219 is mounted in a bearing arrangement which resiliently urges it against roll 218. The shaft 223 of roll 219 rests in the horizontal slots 222 in said superstructure 215. The shaft 223 at both ends thereof is urged toward roll 218 by bearing members 224 which, in turn, are urged by compression springs 225 which surround and are held in place by the rods 226 which pass through openings in the vertical wall 221 of the superstructure and are suitably fastened to transverse bar 227, the other ends of springs 225 resting against the interior surface of said wall 221. The transverse bar 227 has a spindle 231 passing transversely therethrough at a midportion thereof and a manually operable cam member 232 is connected to said spindle, said cam being shown in Figs. 18 and 19 in the position in which the pressure of bearing members 224 is applied to the shaft 223 whereby rolls 218 and 219 are pressed together. Cam 232 is pivotal on spindle 231 to a position at right angles to that shown and is so shaped that in said position the pressure of roll 219 against roll 218 is relieved. The provision of the described means for withdrawing pressure from rolls 218 and 219 is for the purpose of stopping operation of the feed of the strip 216 at the will of the operator to enable him to correct trouble which occasionally occurs in the feeding of such thin flexible material.

The means for imparting intermittent motion to the feed rolls 218 and 219 comprises the shaft 64, sprocket 238 (see Fig. 2), chain 239, sprocket 240 and shaft 241, all of said parts being mounted on main frame 10 and superstructure 215. Connected to shaft 241 is the crank arrangement (see Fig. 18) consisting of crank arm 242 which has a longitudinal slot 243 therein for receiving the adjustable crank pin 244. A portion of the wall of slot 243 is threaded as shown, and a pair of slotheaded screws 245 are threaded into said slot from opposite sides of the pin 244 whereby the position of pin 244 in slot 243 may be adjusted at will. This is for the purpose of changing the effective length of the crank arm and imparting a greater or less travel at intermittent operation of the feed rolls whereby disks of different size may be blanked out of the strip for insertion in cups 11 of different diameters.

Connecting rod 234 is connected to crank pin 244 at one end thereof and at the other end is connected to the pin 235 on the arm 236 of a ratchet and pawl mechanism. Said arm is rotatably mounted on shaft 230 which, in turn, is mounted upon the superstructure 215. Arm 236 carries the pawl 237 which cooperates with the ratchet 228 which is fixedly mounted upon shaft 230. Also fixedly mounted on shaft 230 is the toothed gear 229 which cooperates with idler gear 233 and driving gear 246, both of which are mounted on shafts supported by superstructure 215. Associated with gear 246 is a drum and brake arrangement indicated generally by the numeral 249, said brake arrangement being provided for the purpose of stopping the movement of gear 246 the instant the driving force is discontinued. In positive motion-transmissive relation to gear 246 is a sprocket (not shown) which drives the chain 250, which, in turn, drives a sprocket (not shown) fixedly mounted on the shaft of roll 218. Continuous motion is imparted to the crank 242 by the motor 65 and shaft 64, which motion is converted to an intermittent motion of the feed roll 218 by the ratchet and pawl arrangement 228—237.

The strip is fed downwardly intermittently by rolls 218 and 219 into a narrow slot 247 provided in the superstructure 215, and at each stationary interval in the intermittent feed a pair of punches 248 punch a pair of disks 251 from the strip. The walls of slot 247 contain suitable openings for punches 248, the openings 252 upon the near side of the slot serving as guides for the punches and the openings 253 on the far side serving as die openings. The punches 248 are supported at one end thereof by the cross-head 254, said cross-head being carried by a pair of guide pins 255 which are fixedly mounted in the superstructure 215.

Punching operation is imparted to the punches 248 by means of connecting rod 260 which is connected at the opposite ends thereof to crosshead 254 and a crank 256 which is mounted on shaft 257 which in turn, is mounted on superstructure 215. Also fixedly mounted on shaft 257 is the sprocket 258 which cooperates with chain 261 and sprocket 262 which is fixedly mounted on shaft 241 and which, as has been heretofore described, is continuously operated by the motor 65. Since both the feed rolls and the punches are driven by shaft 241, these parts operate in synchronism with each other.

The punching surfaces of the individual punches of the pair of punches 248 which operate upon the same strip of paper are not in vertical alignment with each other, that is, the punching surface of the lower punch is slightly in advance of that at the other, as is shown in Fig. 19. The purpose of such arrangement is to stagger the punching blows so as to lessen the force of the impact transmitted to the machine.

A pair of vertical slots 263 and 264 (see Figs. 1 and 27) are arranged in the superstructure 215 communicating respectively with the ends of the different die openings 253, slot 264 being offset forwardly with respect to slot 263, as shown in Fig. 20, and the punching faces of the two punches 248 are offset by a similar distance. The punches, upon blanking the two disks 251 from the strip 216 carry said disks across the die openings 253 and to the rearward ends thereof where the respective disks are deposited substantially simultaneously in the slots 263 and 264 and descend by gravity to positions at the lower end of the slots where they are inserted in the cups 11. The strip 216 from which the disks have been blanked is suitably fed between a pair of lower feed rolls and away from the apparatus, as illustrated in Fig. 19. The strip in this condition is illustrated in Fig. 28.

The inserting mechanism is shown in detail in Figs. 20 to 23. The disks are inserted by means of reciprocating plungers 265 and 266 which are supported in the elongated housing 267 which is joined to housing 173—175 and extends rearwardly beyond the latter housing (see Fig. 2) and is closed at the forward end thereof by the cover plate 268. The housing 267 has a cylindrical compartment for each of the plungers 265 and 266 and within each said compartment is a frictionless bearing 269 in the form of a sleeve, said sleeves being slidably mounted within the compartments. The plungers 265 and 266 have enlarged forward portions as shown, each said forward portion being attached to a driving bracket 272, which bracket is suitably attached to the reciprocating spider 82 by attaching means which are not shown. Longitudinal slots 273 and 274 are provided at the undersides of housing 267 and sleeves 269 to accommodate the reciprocating motion of brackets 272. At the rearward end of sleeves 269 is arranged a member comprising a pair of combination slots and dies, said member being designated generally by the numeral 270 and comprising a pair of cap pieces 271 and 275, piece 275 being press fitted upon the ends of the sleeves 269 and piece 271 being press fitted upon piece 275. Said pieces are so shaped as to provide end slots 276 and 277 registering respectively with the bottom ends of slots 264 and 263 for the reception of disks 251 as they descend out of the latter slots. The slots 276 and 277 are flared at their upper ends as shown in Fig. 20 to facilitate the entrance of the disks 251 therein. Piece 271 has two circular openings 279 registering respectively with punches 265 and 266, said openings being of somewhat smaller diameter than the disks 251 and serving as dies for the shaping of the disks into shallow trays before they are inserted into the cups.

At the forward end of sleeve 269, there is attached thereto a cap 278 which has an integral post or shank 281 extending forwardly therefrom and through an opening in the cover plate 268. The shank and cap have a threaded opening extending forwardly therethrough into which a slot-headed bolt 282 is threaded. The forward portion of shank 281 is also threaded and carries the nut 283. Surrounding shank 281 and under compression between cap 278 and cover plate 268 is a compression spring 284.

In Fig. 20 the mechanism is shown in the position it occupies after a disk has been inserted in a cup 11 and the mechanism has returned to its forward position. The synchronism of the machine is such that a pair of disks are deposited from slots 263 and 264 into position for insertion in the next pair of cups 11. At the same time, the indexing plate 27 is indexed to the next station and the next pair of cups is brought into alignment with the plungers 265 and 266. Under the influence of spider 82, the plungers are moved in the rearward direction. This rearward movement of the plungers is accompanied by a rearward movement of sleeves 269 under the influence of compression springs 284 which expand as the plungers advance and move the sleeves rearwardly until the member 270 makes contact with the forward edges of liners 211. Said member 270 pushes said liners rearwardly in the cups 11 until the rearward edges of the liners contact the bottoms of the cups, thereby positioning the liners properly within the cups. Nuts 283 are so located that when the last-mentioned position is reached, nuts 283 make contact with cover 268 and the rearward movement of the sleeves 269 and member 270 is stopped. This position of members 269 and 270 is illustrated in Fig. 21. The plungers continue to advance under the influence of spider 82 until they make contact with disks 251, when they force said disks into openings 279, thereby shaping said disks into the form of shallow trays which operation is shown as having been accomplished by plunger 265 in Fig. 21. The plungers continue to push the shallow cups through openings 279 and into the lined cups 11, and they continue to push the disks until they rest against the bottoms of the cups, as is shown in Fig. 20. The interior diameter of opening 279 is slightly smaller than the interior diameter of liner 211 in order to insure that the tray will readily enter the liner. Once inside the liner, the rim of the tray expands slightly into resilient contact with the liner, to make the intimate contact shown in Fig. 20.

The pungers 265 and 266 are then retracted by spider 82 and bracket 272, and they move forwardly until their forward ends come in contact with the bolts 282, when they move the bolts and the attached sleeves 269 back to the forward position shown in Fig. 20. Under the influence of compression spring 284, the forward movement of sleeves 269 is stopped when the forward movement of the plungers stops. While the plungers are being returned to their forward positions, the indexing plate 27 is indexed to the next station and the cycle of operations is repeated.

At the next station, which is designated by the numeral 280 two cups are tested for the presence of the liners and the bottom disks. Only one of the mechanisms for making these tests will be described in detail. It is illustrated in Figs. 24, 25 and 26. In Fig. 24, a cup is shown containing both the liner and the disk. The mechanism is supported in its entirety and moved by the spider 82. The supporting bracket 306 is bolted to the spider 82 and carries the two-piece cylindrical housing 290, said housing being formed in two pieces to permit access to the interior. The housing is open at its rearward end and closed at its forward end with an opening in said forward end for the passage therethrough of the rod 301. Within housing 290 is slidably supported a hollow cylindrical sleeve 291. At the forward end thereof, sleeve 291 has an external flange 285 which is adapted to abut against the forwardly-facing shoulder 286 of the housing 290. At the rearward end thereof, sleeve 291 is both interiorly and exteriorly threaded. The rod 301 has an enlarged section 287 at an intermediate portion thereof so located as to slide longitudinally within the smooth walled portion of sleeve 291, both end portions of rod 301 being of reduced diameter as shown. An exteriorly threaded tube 288 is threaded into the rearward end of sleeve 291. A feeler cap 289 is threadedly fastened upon the rearward end portion of tube 288. The rearward reduced portion of rod 301 fits slidably within tube 288 and projects substantially from the rearward end thereof. A compression spring 292 surrounds the forward reduced portion of rod 301 and is under compression between the forward face of enlarged section 287 and the rearward face of the end wall of housing 290.

The end portion of rod 301 projecting forwardly of housing 290 is threaded and upon this portion is laterally extending arm 293 is fastened by means of nuts 294. A second arm 295 is fastened in a similar manner by nuts 296 upon the rearward end of sleeve 291, and extends laterally in the same direction as arm 293. An operating bar 297 is mounted upon the free ends of arms 293 and 295 and extends generally parallel to rod 301, said rod 297 at its forward end being rigidly fastened to arm 293 by means of nuts 298 and at its rearward end being supported slidably on arm 295 by means of the tube 299 which passes through an opening in arm 295 and is fastened to said arm by means of the nuts 302. The rearward end of tube 299 is closed except for a small opening, and the rearward end of operating bar 297 is reduced as shown at 300, said reduced end portion extending through the opening in the closed end of tube 299. The exterior surface of the closed end of tube 299 and the reduced portion 300 of operating bar 297 are both arranged in cooperative relation with the operating plunger of the normally closed switch 303. Said switch is mounted upon the bracket 304, which, in turn, is mounted upon the main frame of the machine. A compression spring 305 surrounds the portion of sleeve 291 between the rearward end of housing 290 and nuts 296, and is held under compression between said housing and nut.

Assume, as is illustrated in Fig. 24, that the indexing plate has moved cup 11 to station 280 and that the liner 211 and the bottom disk 251 are both present. The entire mechanism is advanced rearwardly by the spider 82, and the feeler cap 289 makes contact with the forward edge of the liner 211, thereby restraining the rearward movement of tube 288, arm 295 and tube 299, whereby the rearward face of tube 299 does not make engagement with the operating plunger of switch 303 and said switch remains closed.

At the same time, the rod 301 is restrained in its rearward movement by the bottom disk 251, and as a result, the rearward travel of operating bar 297 is restrained so that the operating end 300 thereof does not engage the operating plunger of switch 303 with operating pressure, and said switch remains closed.

In Fig. 25 is illustrated the situation when the bottom disk 251 is absent, while the liner 211 is present. The rearward face of tube 299 is restrained from operating the switch in the manner heretofore described, but the absence of the bottom disk permits the rod 301 to undergo greater rearward travel, sufficient that the reduced end portion 300 of operating bar 297 makes operating pressure contact with the operating plunger of switch 303, whereby said switch is caused to open. Opening of said switch causes the operation of a time-delay mechanism which is adapted to eject the defective cup when it arrives at the next station. Such time-delay mechanism is illustrated in Fig. 30 and will be described hereinafter.

In Fig. 26 is shown the condition when the liner 211 is absent and the bottom disk 251 is present. In such case, the rod 301 is restrained in its rearward motion so that the operating end 300 of bar 297 does not cause operation of the switch 303, but the feeler cap 289 is not restrained in its rearward movement but progresses until it makes contact with the edge of the cup 11 with the result that tube 299 travels rearwardly and its rearward face engages the plunger of switch 303 with operating pressure and causes said switch to open. The result in the case of the absence of the liner is the same as in the absence of the bottom disk, namely, the time-delay mechanism is set in operation for ejecting the cup at the next station.

After the cup has been tested for the absence of the liner and bottom disk, the testing mechanism is withdrawn by spider 82 to the forward position. If switch 303 has been opened during the testing operation, it is now closed. Also, at this time the indexing plate 27 is indexed to the next station which is indicated by the numeral 311, at which the defective cups 11, that is, cups with either the liner or the bottom disk absent, are ejected.

One of the ejecting mechanisms, as well as one of the testing mechanisms, is illustrated in Fig. 30, it being understood that two such mechanisms are present in the apparatus. The ejecting mechanism consists of energy supply conductors 307 which are connected to the primary supply circuit 105—106 and supply energy to the normally open solenoid valve 308 through the timing relay 309. Relay 309 is of conventional construction, a suitable type being the pneumatic automatic reset timing relay in which, upon deenergization of the timer coil thereof, air is displaced at a controlled rate by a diaphragm from one chamber to another to provide the desired time delay, and during this period the influence of energizing conductors 307 is locked out and upon the completion of the delay period the relay is automatically reset to be influenced by conductors 307.

As long as switch 303 remains closed and relay 309 is energized, valve 308 remains energized and in the closed position, and the cups are not ejected at station 311. Upon operation of the switch 303 to the open position as shown in Fig. 30, the relay 309 is de-energized, and the delay mechanism is set in operation. After elapse of the desired delay period the solenoid valve 308 is de-energized and operated to the open position and after elapse of a further period relay 309 is reset to the original position. Valve 308 is connected in the air pressure conduit 312 which is connected to the primary air pressure supply 60 which has been described hereinbefore. The relay 309 is so adjusted that when switch 303 is opened because of the presence of a defective cup at station 280 as described heretofore, the relay causes valve 308 to open when the defective cup arrives at station 311, whereby the cup is subjected to a blast of air under pressure admitted to the conduit 312 by the valve 308. Said cup is propelled forwardly by the blast of air out of the recess in the indexing plate 27 and into a forwardly located chute 314 which is suitably mounted upon the frame plate 14 of the machine, the ejecting means being illustrated fragmentally in Fig. 1. Relay 309 is so adjusted that after the cup 11 has been ejected the relay is reset to its original position. By that time, switch 303 has been closed following the previous testing operation and relay 309 is energized and valve 308 is also energized and is closed. The adjustment of relay 309 and the synchronism of the machine are such that the relay is reset before the occurrence of the testing operation upon the next pair of cups 11 at station 280.

If the bottoms of the cups rest directly against plate 14, it is sometimes difficult for the blast of air to move them forwardly, and to impart an initial forward movement, cam rails 313 are provided as illustrated in Figs. 25 and 29. Said cam rails give the cups an initial forward movement away from plate 14 and the air blast from conduit 312 effectively projects them forward and into reject chute 314. Those cups which are in proper condition are also moved forwardly by cam rails 313, but are moved only a short distance, and as the indexing plate 27 progresses around to the position where the cups drop out of the recesses 28 of said plate by gravity, they fall into the guideway or chute 315 from which they are discharged into a suitable container. Chute 315 is suitably supported on the main frame 10 and the plate 14.

By way of explanation, to complete a cell, as illustrated in Fig. 31, a body of depolarizing mix 320 is tamped within the liner 211 and upon the bottom disk 251, a carbon rod terminal 321 is inserted vertically into the center of the mix, the upper portion of the liner is folded inwardly over the top of the mix cake, a top insulating washer 322 is impaled upon the carbon rod and in contact with the interior surface of the cup 11, and an insulating seal closure 323 of fusible composition such as wax or pitch is inserted on the top of the washer.

Invention is claimed as follows:

1. In apparatus for making dry cells having open-top cylindrical cups, an indexing member having a plurality of recesses each adapted to receive a cup, means for indexing said recesses successively to a plurality of stations, means for feeding cups successively to said recesses at one of said stations, means for feeding a strip of sheet material, means for severing said strip into sections, means for coiling each said section into a cylinder, means for inserting a cylinder into a cup at a second station, means for feeding a second strip of sheet material, means for blanking disks out of said second strip, means for inserting a disk into the bottom of a cup at a third station, a single support for said cylinder and bottom disk inserting means, means for mounting said support for reciprocation, and means for imparting reciprocating motion to said support.

2. The apparatus as claimed in claim 1 in which pneumatic means are provided for imparting reciprocating motion to the support.

3. In apparatus for inserting a cylindrical liner in a dry cell anode in the form of an open-top cup, a mandrel mounted for rotation and longitudinal reciprocation, means for stationing said cup in substantial alignment with said mandrel with said open-top facing the mandrel, the exterior of said mandrel being cylindrical and having a flattened section extending longitudinally thereof, said mandrel being hollow and having openings connecting said flattened surface section with the interior thereof, means for continuously rotating said mandrel and reciprocating said mandrel between a position in front of said cup and a position within said cup, means for feeding a flexible sheet with the leading surface thereof in tangential relation with said mandrel when said mandrel is at said position in front of said cup, means for applying suction to the hollow interior of said mandrel during said feed of said sheet and reciprocation of said mandrel from said front position to said position within said cup, whereby said sheet is drawn to said mandrel and coiled thereon into a cylinder, and means for applying pneumatic pressure to said interior upon arrival of said mandrel at said position within said cup, whereby said cylinder is released from said mandrel and expands into contact with the interior wall of said cup.

4. In apparatus for making dry cells having open-top cylindrical cups, a circular indexing member having a plurality of outwardly opening recesses spaced apart around the periphery thereof, a plurality of working stations arranged adjacent the periphery of said indexing member, means for rotating said indexing member and indexing said recesses successively to the plurality of stations, means for feeding cups successively to said recesses at a first station; a second station comprising means for detecting the absence and improper orientation of a cup and means responsive to said detecting means for stopping said apparatus in case of said absence or improper orientation of a cup; means for feeding a strip of sheet material; a third station comprising means for severing said strip into sections, means for coiling each said section into a cylinder and means for inserting a cylinder into a cup; means for feeding a second strip of sheet material; a fourth station comprising means for blanking disks out of said second strip, means for shaping a disk into a shallow tray, means associated with said disk-shaping means for pushing said inserted cylinder into proper position in said cup; and means for inserting a tray-shaped disk into the bottom of a cup; a fifth station comprising means for detecting the absence of a cylinder and a disk from a cup, and a sixth station comprising means responsive to said last-mentioned detecting means for ejecting a cup in which a cylinder or disk is absent.

5. In apparatus for making dry cells having open-top cylindrical cups, a circular indexing member having a plurality of pairs of outwardly opening recesses spaced apart around the periphery thereof, each recess being adapted to receive a cup, a plurality of working stations arranged adjacent the periphery of said indexing member, means for indexing said recesses successively to the plurality of stations; means for feeding a pair of cups substantially simultaneously to a pair of said recesses at a first station; a second station comprising duplicate means for detecting the absence and improper orientation of said respective cups, and means responsive to said detecting means for stopping said apparatus in case of said absence or improper orientation of either of said cups; duplicate means for respectively feeding a pair of strips of sheet material; a third station comprising duplicate means for severing said strips into sections, coiling said sections into cylinders and inserting said respective cylinders into said respective cups; means for feeding a third strip of sheet material; a fourth station comprising means for blanking disks from said third strip, duplicate means for shaping a pair of disks into shallow trays, duplicate means associated with said disk-shaping means for pushing said inserted cylinders into proper position in each of said cups and duplicate means for respectively inserting substantially simultaneously one of said tray-shaped disks into the bottom of each of said cups, and a fifth station comprising duplicate means for detecting the absence of a cylinder or bottom disks in said cups respectively, and a sixth station comprising duplicate means responsive respectively to said last mentioned detecting means for rejecting either of said cups in which a cylinder or disk is absent.

6. In apparatus for making dry cells having open-top cylindrical cups, a circular indexing member having a plurality of outwardly opening recesses spaced apart around the periphery thereof, a plurality of working stations arranged adjacent the periphery of said indexing member, means for rotating said indexing member and indexing said recesses successively to the plurality of stations; means for feeding cups successively to said recesses at a first station; means for feeding a strip of sheet material; a second station comprising means for severing said strip into sections, means for coiling each said section into a cylinder and means for inserting a cylinder into a cup; means for feeding a second strip of sheet material; and a third station comprising means for blanking disks out of said second strip, means for shaping a disk into a shallow tray, means associated with said disk-shaping means for pushing said inserted cylinder into proper position in said cup, and means for inserting a tray-shaped disk into the bottom of a cup.

7. In apparatus for making dry cells having open-top cylindrical cups, a circular indexing member having a plurality of pairs of outwardly opening recesses spaced apart around the periphery thereof, each adapted to receive a cup, a plurality of working stations arranged adjacent the periphery of said indexing member, means for indexing said recesses successively to the plurality of stations; means for feeding a pair of cups substantially simultaneously to a pair of said recesses at a first station; duplicate means for respectively feeding a pair of strips of sheet material; a second station comprising duplicate means for severing said strips into sections, coiling said sections into cylinders and inserting said respective cylinders into said respective cups; means for feeding a second strip of sheet material, and a third station comprising means for blanking disks from said second strip, duplicate means for shaping a pair of disks into shallow trays, duplicate means associated with said disk-shaping means for pushing said inserted cylinders into proper position in each of said cups; and duplicate means for respectively inserting substantially simultaneously said tray-shaped disks one into the bottom of each of said cups.

8. In apparatus for making dry cells having open-top cylindrical cans in which circular can liners and bottom-tray discs are inserted in said cans, a circular indexing member having a plurality of outwardly opening can-receiving recesses, means for indexing said recesses to a plurality of stations, means at one of said stations for detecting the absence and improper orientation of a can comprising a pair of motor control switches, a pair of switch operators associated with said switches, a can sensing element associated with said switch operators, and means for moving said element into can sensing relationship with a can at said one station, whereby when a can is absent from said recess said element actuates one of said switch operators, and when a can is improperly oriented in said recess said element actuates the other of said switch operators to stop the motor driving said apparatus.

9. In apparatus for making dry cells having open-top cylindrical cans in which circular can liners and bottom-tray discs are inserted in said cans; means for indexing cans to a plurality of stations; means at one of said stations for inserting bottom tray discs into a can containing a liner comprising means for blanking discs out of sheet material, cooperating punch and die means for shaping said disc into a shallow tray, and means associated with said die for seating said liner in the bottom of its can, said punch member operating to insert said tray into said can after the liner is seated.

10. The method of assembling dry cells having open-top cylindrical cups comprising inserting a pre-coiled cylindrical liner into an open-top cup and thereafter pushing a flat disk of paper having a diameter greater than the inside diameter of said liner into said cup to automatically form a tray-shaped cup bottom insulating element having a resilient peripheral flange of uniform height frictionally engaging said liner with radial resilient pressure to provide tight contact between said element and said liner and between said liner and said cup to frictionally retain the liner in place during the assembly thereof.

References Cited in the file of this patent

UNITED STATES PATENTS

| | | |
|---|---|---|
| 1,089,618 | Anderson | Mar. 10, 1914 |
| 1,173,763 | Baker | Feb. 29, 1916 |
| 1,210,577 | Williams | Jan. 2, 1917 |
| 1,336,838 | Heeter | Apr. 13, 1920 |
| 1,707,209 | Broadmeyer | Mar. 26, 1929 |
| 1,708,828 | Bremmerman | Apr. 9, 1929 |
| 2,318,208 | First et al. | May 4, 1943 |
| 2,428,098 | Schmidt | Sept. 30, 1947 |
| 2,648,419 | Detrez | Aug. 11, 1953 |

FOREIGN PATENTS

| | | |
|---|---|---|
| 568,834 | Germany | Jan. 10, 1930 |

UNITED STATES PATENT OFFICE
CERTIFICATE OF CORRECTION

Patent No. 2,864,286                                                         December 16, 1958

Edward R. Rawson et al.

It is hereby certified that error appears in the printed specification of the above numbered patent requiring correction and that the said Letters Patent should read as corrected below.

Column 18, line 34, after "assembly thereof." insert the following claim:

11. In apparatus for making dry cells having open-top cylindrical cans in which circular can liners and bottom-tray discs are inserted in said cans; means for indexing cans to a plurality of stations; means at one of said stations for testing cans for the presence of liners and disks and means at the next adjacent station for rejecting deficient cans; said can rejecting means comprising a time delay mechanism and means operated thereby for forcibly ejecting a can from said apparatus; said testing means comprising unitary liner and disk sensing means, means for advancing and retacting said sensing means to and from sensing relationship with a can and switch means for said time delay mechanism operable by said sensing means upon the absence of either a liner or disk from a can to activate said time delay mechanism so that when said deficient can reaches said next adjacent station it is ejected from the apparatus.

In the heading to the printed specification, line 7, for "10 Claims." read -- 11 Claims. --.

Signed and sealed this 21st day of July 1959.

(SEAL)
Attest:

KARL H. AXLINE
Attesting Officer

ROBERT C. WATSON
Commissioner of Patents